Dec. 8, 1925.

A. MARCUSE ET AL 1,564,432

DEVICE FOR TESTING GUN BARRELS AND THE LIKE

Filed Aug. 24, 1921  2 Sheets-Sheet 1

Inventors
ADOLF MARCUSE
HERMANN WANSCHAFF
By
Biesen & Schrenk
Attorneys

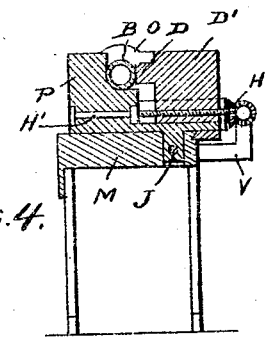
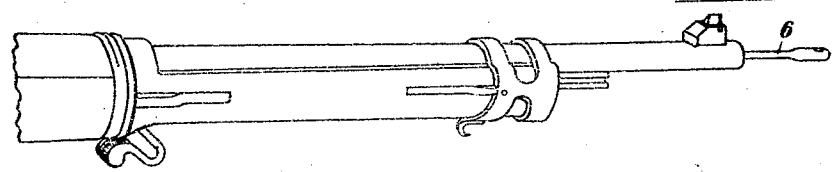
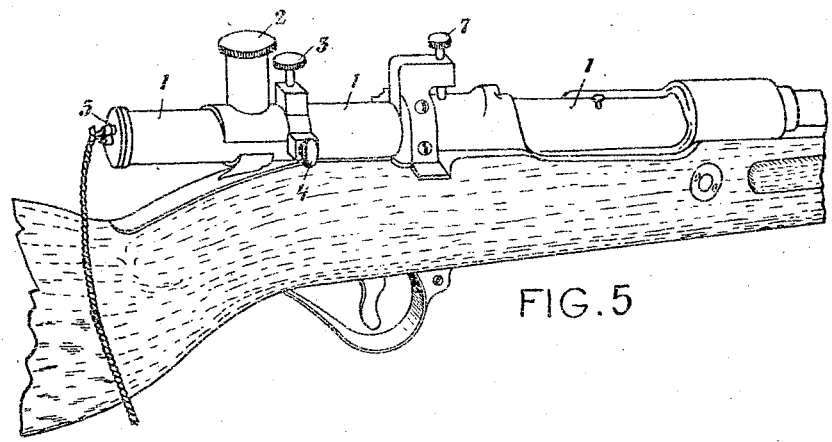

Patented Dec. 8, 1925.

1,564,432

UNITED STATES PATENT OFFICE.

ADOLF MARCUSE, OF BERLIN-CHARLOTTENBURG, AND HERMANN WANSCHAFF, OF BERLIN, GERMANY, ASSIGNORS TO THE FIRM "PAG" AKTIENGESELLSCHAFT FÜR INDUSTRIE UND TECHNIK, OF BASEL, SWITZERLAND.

DEVICE FOR TESTING GUN BARRELS AND THE LIKE.

Application filed August 24, 1921. Serial No. 494,787.

(GRANTED UNDER THE PROVISIONS OF THE ACT OF MARCH 3, 1921, 41 STAT. L., 1313.)

*To all whom it may concern:*

Be it known that we, Professor Dr. ADOLF MARCUSE, university professor, of German nationality, residing at 12 Dahlmannstrasse, Berlin-Charlottenburg, Germany, and HERMANN WANSCHAFF, mechanic, of German nationality, residing at 1 Elisabeth-Ufer, Berlin, S. O. 26, Germany, have invented certain new and useful Improvements in Devices for Testing Gun Barrels and the like (for which we have filed applications in Germany, April 27, 1916, July 30, 1918, August 7, 1918, November 26, 1918; Switzerland, January 3, 1919; Italy, June 30, 1920; Austria, July 7, 1917; Hungary, July 11, 1917; Poland, July 10, 1920; Czechoslovakia, July 2, 1920, May 30, 1921; Denmark, January 11, 1919; Sweden, January 18, 1919; the Netherlands, January 9, 1919; Great Britain, July 10, 1920; Spain, September 2, 1920; Belgium, July 9, 1920; France, July 8, 1920) ; and we do hereby declare the following to be a full, clear, and exact description of the invention, of which the following is a specification.

This invention relates to a device for the optical testing or examination of gun-barrels and the like. The object of our invention is to provide a device of the class indicated which will not require any special skill or experience on the part of the operator and which will enable the user to ascertain whether the barrel under test is straight or not and, in the event of the barrel's being curved, to determine the extent as well as the direction of the curvature, so as to enable the workman to straighten the barrel just so much as is required to correct the existing deviation. In the preferred form of our invention, the testing device is combined with a straightening device in such a way as to preserve the proper relation of these two devices, that is to say, in such a manner that the straightening device will be kept in operative relation to that portion of the barrel which is undergoing examination at the time.

Figure 1:
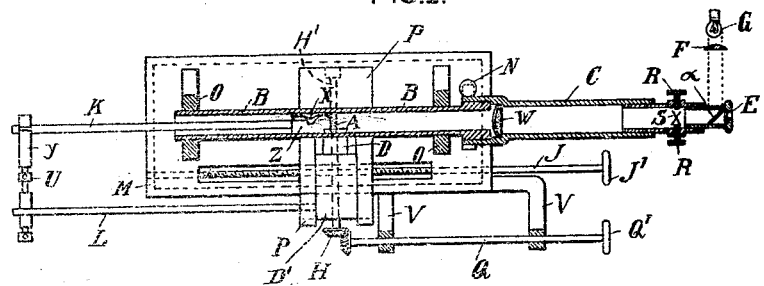
Figure 2:
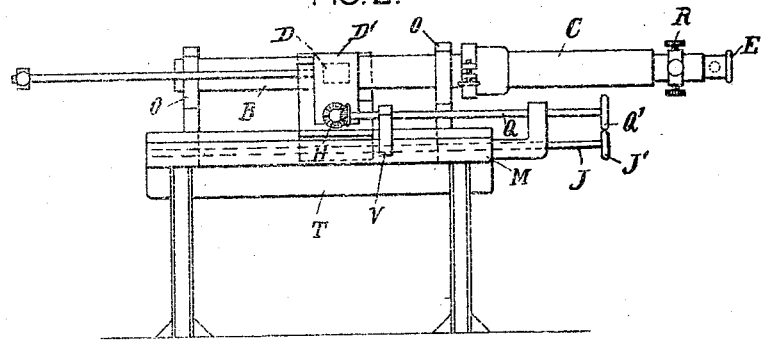

Two typical examples of our invention are illustrated by the accompanying drawings in which Fig. 1 is a plan view of one form of our invention with parts in section; Fig. 2 is a side elevation thereof; Fig. 3 is a perspective view showing a second form of our invention; Fig. 4 is a vertical section through the central portion of Figs. 1 and 2; and Fig. 5 is a perspective view showing the left-hand continuation of the device illustrated in Fig. 3.

Referring first to the construction shown in Figs. 1 and 2 we have illustrated the barrel B or like article to be examined as supported in bearings O which hold it against longitudinal motion but allow it to be rotated. These bearings are carried by a bed M supported by a frame T. Within the barrel B is mounted, to move lengthwise, a cylindrical carrier or block Z fitted with a plate spring X so as to hold said carrier steady within the barrel. This carrier Z is connected with a rod K extending lengthwise of the barrel B and projecting at one end thereof. At the end opposite to the rod K the carrier Z is provided with a mirror A perpendicular to the longitudinal axis of said carrier.

At the end of the barrel B opposite to the one from which the rod K projects, a telescope C is secured in any suitable manner, for instance, by means of a split ring having a clamping crew N. The telescope has an objective W and an eye-piece E of any suitable construction and between these two parts of the telescope is arranged a member S carrying a suitable mark such as well known cross-hairs indicated symbolically by a cross in Fig. 1. This cross-hair or other examination mark is preferably adjustable so as to bring it to a perfectly central position; in Figs. 1 and 2 we have shown screws R by which the carrier of said mark may be adjusted up or down as well as toward the left or toward the right for the purpose just mentioned. It will be understood that the optical axis of the telescope coincides with the core axis of the barrel if the latter is perfectly straight.

Rays of light from a suitable source such as an incandescent electric lamp G are directed into the telescope, a lens F serving to direct the light in parallel rays upon a reflector $a$ located within the telescope at an angle of 45° to the axis thereof so that the reflected rays of light will be directed along the axis of the telescope. These rays of light will therefore illuminate the cross-hairs or other examination mark S and will also reach the mirror A and be reflected by the latter toward the eye-piece E. The observer looking through the eye-piece will therefore be able to see, at the same time, the cross-hairs or other examination mark and the reflection of such cross-hair in the mirror A. If the barrel is absolutely straight in all of its portions the examination mark will coincide with its reflected image for all positions to which the mirror A may be moved lengthwise of the barrel.

The apparatus so far as described is complete as regards the testing operation which may be conducted as follows: The mirror A is first placed at one end of the barrel, preferably the one remote from the telescope. Then the operator adjusts the examination mark or examination device S in such a way that it will coincide with its reflection which he sees in the mirror A. Thereupon the observer moves the mirror A gradually to different portions of the barrel (by means of the rod K) and notes whether the examination mark and its reflection continue to coincide. If they do for all positions of the mirror the barrel is straight. If, however, the barrel has a bend or deviation at any point, this will show immediately inasmuch as at any such defective point a line drawn perpendicular to the plane of the mirror A through the point where the axis of the telescope intersects said plane, will no longer coincide with the axis of the telescope but will form an angle therewith; therefore the image reflected by the mirror will no longer coincide with the directly observed examination mark S but will appear shifted relatively to said mark in a direction and to an extent corresponding to the deviation of the barrel from the true line at that point.

The device might be used simply for examining or testing gun-barrels or the like in the manner described, the examiner noting down the deviations at various points of the barrel and subsequently the barrel would be straightened, if desired, in any suitable or well known manner.

We have, however, in Figs. 1, 2 and 4 illustrated an additional feature of our invention which consists in combining with the testing device, a straightening device operatively connected therewith in such a way that both devices will preserve their proper mutual relation notwithstanding any adjustment lengthwise on the barrel.

The straightening or pressure device illustrated comprises a slide P movable lengthwise of the bed M. This pressure device has suitable parts to engage the barrel B on opposite sides and one of these parts, shown as a jaw D, is movable toward and from the barrel B to exert pressure thereon and correct any bend therein. This jaw D may, for instance, be formed on a slide D' which is movable on the slide P in a horizontal direction perpendicular to the path of said slide P. The details of the pressure device may be constructed in any suitable manner. We have indicated a spindle H' journalled in the slide P in such a way that the spindle can turn but cannot move lengthwise of its own axis, said spindle having a screwthreaded portion engaging a corresponding portion of the slide D' so that rotation of the spindle H' will move the slide D' and the jaw D toward or from the barrel. The spindle H' is operated in any suitable manner, for instance, by means of a bevel gearing H and of a longitudinal shaft Q supported in bearings V and provided with a hand wheel Q'. The slide P is provided with a screwthreaded opening engaged by a corresponding portion of a screw spindle J which is journalled in the bed M in such a way as to prevent longitudinal motion of the spindle while permitting its rotation. A hand wheel J' serves to turn the spindle and thus move the slide P lengthwise of the bed M. In order that the mirror A may move in unison with the slide P and preserve such a relation that the mirror will be always in substantial registry with the movable jaw D, we have shown a connection between said slide P and the rod K. This connection may be made in any suitable manner, for instance, by means of a longitudinal rod L secured to the slide P and connected with the outer end of the rod K by means of a transverse rod Y provided with a universal joint or turnbuckle U. In order that the apparatus may work properly in connection with rifled barrels as well, the rod K is connected with the crossbar Y in such a way that the rod may turn relatively to said bar. With this form of our invention it will be noted that during the progress of the testing operation conducted as described above, the pressure device on the slide P will be automatically and continuously kept in proper relation to the particular portion of the gun-barrel under test at each particular moment; that is to say, as pointed out above, the jaw D will remain in registry with the mirror A. Therefore as soon as the observer looking through the telescope notes that the barrel is not true at any particular point, he can at once effect the necessary correction by turning the hand wheel Q' to bring the jaw D into operation. Of course he will turn the barrel B on its axis, if necessary, to bring the deviation or bend of the barrel exactly toward the jaw D). Not only can the correction be made immediately at the very point where a deviation is discovered but the observer can continue looking through the telescope while the pressure device is being operated to effect a correction and can therefore watch the result of the pressure operation and continue it just to the required extent, that is to say, until the reflected image coincides with the examination mark.

In Figs. 3 and 5 we have illustrated another form of our invention which is adapted particularly for the testing of barrels of finished guns or rifles, that is to say, for the testing of barrels mounted on a suitable stock and without removing the barrel from the stock. In this case the telescope 1 has its one end, which is adapted for connection with the gun-barrel, constructed of a dimension corresponding to that of the ordinary gun-lock. The telescope 1 can be fitted into the barrel in the same way that the gun-lock was fitted before. The telescope 1 in this case is preferably constructed as a so-called Newtonian telescope, that is to say, the eye-piece 2 does not, as in Figs. 1 and 2, lie in the optical axis of the instrument but at right angles thereto. The telescope contains the usual mirror of Newtonian telescopes, set at an angle of 45° to the telescope axis so that the observer may receive rays of light travelling lengthwise of the telescope axis and then reflected to the eye-piece 2. At 3 and 4 we have indicated vertical and horizontal screws having the same function as the screws R of Figs. 1 and 2, that is to say, these screws serve to adjust laterally or vertically an examination mark located within the telescope between the object glass located at the barrel end of the telescope and the lateral tube carrying the eye-piece 2. The rays of light in this particular case come from an electric incandescent bulb, the holder of which is shown at 5, said bulb being fitted into the end of the telescope opposite to that which is connected with the barrel of the gun. At 6 we have indicated a rod which corresponds to the rod K of Fig. 1, said rod being connected at its inner end with a carrier and a mirror such as Z and A respectively in Fig. 1. The rod 6 may be moved by hand to any desired position within the barrel. As in the first form of our invention, the mirror carried by the rod 6 would be first placed at one end of the gun-barrel and the cross-hairs or other examination device adjusted by means of the screws 3 and 4 until such mark coincides with its reflection observed through the eye-piece 2. Then the mirror would be shifted lengthwise of the gun-barrel by moving the rod 6 lengthwise and if the reflected image should fail to coincide with the directly observed mark for any position of the rod 6, this would indicate that the barrel is not true at that particular point and a corresponding note would be entered by the observer. At 7 we have indicated a set screw to clamp the telescope 1 in place during the test.

We claim as our invention:

1. A device for testing gun-barrels and like articles comprising a mirror adjustable lengthwise in the barrel, an eye-piece arranged exteriorly of the barrel in such a position as to permit the interior of the barrel to be inspected, means for throwing rays of light into the interior of the barrel and against said mirror, and a stationary examination mark located between said eye-piece and said mirror.

2. A device for testing gun-barrels and other articles comprising a mirror adjustable lengthwise of the gun-barrel and having its reflecting surface transverse thereto, an eye-piece located outside the barrel and arranged in such a position as to permit inspection of its interior, means for directing rays of light longitudinally of the barrel and against said mirror, and a stationary examination mark located between said eye-piece and said mirror.

3. A device for testing gun-barrels and the like comprising a mirror adapted to be adjusted lengthwise of the barrel, an eye-piece arranged in such a position as to permit inspection of the interior of the barrel, means for directing rays of light upon said mirror in such a manner that they will be reflected toward the eye-piece, a normally stationary examination mark located between said eye-piece and said mirror, and means for adjusting said mark transversely.

4. A device for testing gun-barrels and the like comprising a carrier adapted to be moved lengthwise within the barrel, a mirror on one end of said carrier, an eye-piece arranged in such a position as to permit the interior of the barrel to be inspected, means for directing rays of light on said mirror, and a stationary examination mark between said eye-piece and said mirror.

5. A testing device for gun-barrels and the like comprising a carrier movable lengthwise in the gun-barrel, a mirror on one end of said carrier, a spring for pressing said carrier against the inner wall of the gun-barrel, an eye-piece for inspecting the interior of the barrel, means for directing rays of light on said mirror and an examination mark located between said mirror and said eye-piece.

6. A device for testing gun-barrels and the like comprising a mirror adjustable lengthwise within such barrel and arranged to change the angle of its plane relatively to its original position whenever such mirror reaches a crook in the barrel in whatever direction such crook may extend, an eye-piece for inspecting the interior of the barrel and an examination mark located between said eye-piece and said mirror.

7. A device for testing gun-barrels and the like comprising a member movable lengthwise within the barrel and also movable relatively thereto in any transverse direction, whereby said member is enabled to follow deviations of the barrel in any direction and means for observing rays of light coming from said member.

In testimony whereof we have signed our names to this specification.

PROF. DR. ADOLF MARCUSE.
HERMANN WANSCHAFF.